Feb. 3, 1942.  M. E. MATHESON ET AL  2,271,655
SIGNAL SWITCH
Filed May 1, 1939  2 Sheets-Sheet 1
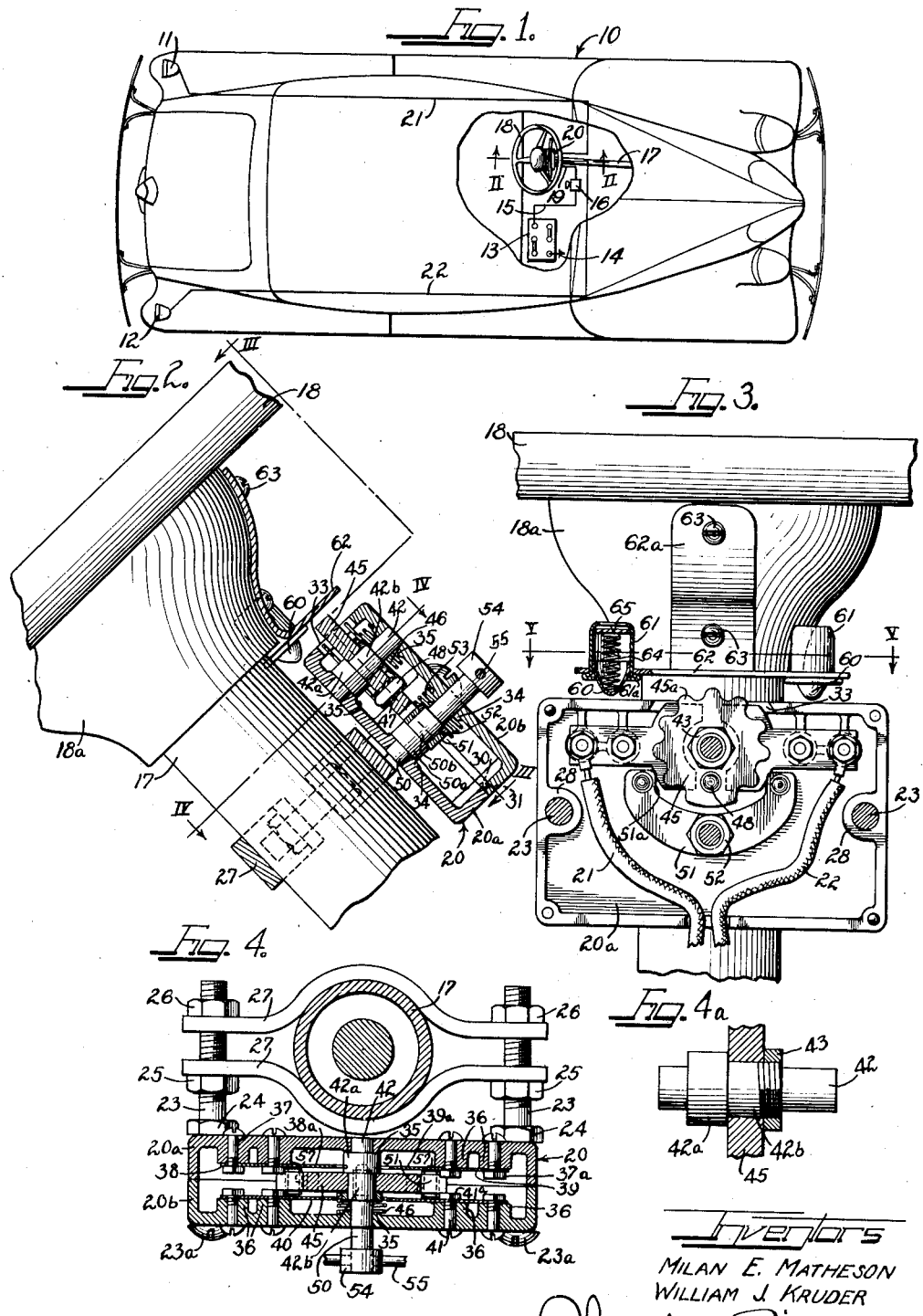
Inventors
MILAN E. MATHESON
WILLIAM J. KRUDER Feb. 3, 1942.     M. E. MATHESON ET AL     2,271,655
SIGNAL SWITCH
Filed May 1, 1939     2 Sheets-Sheet 2
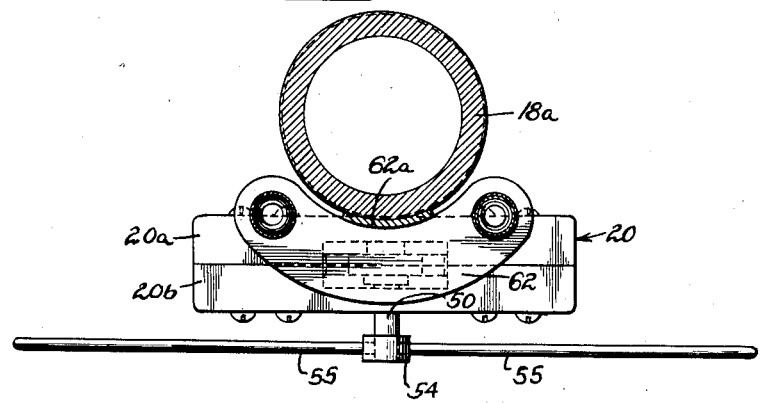
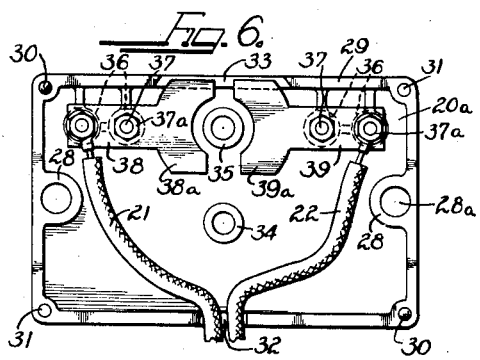
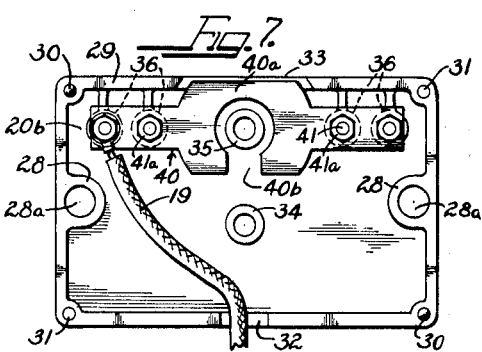
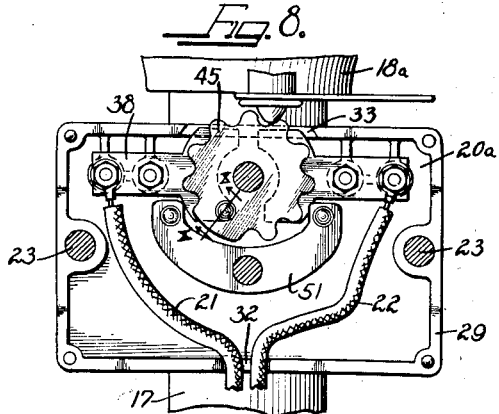
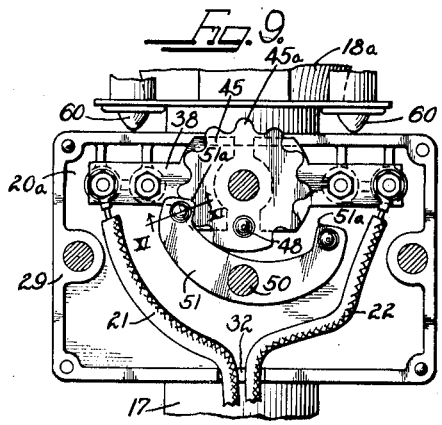
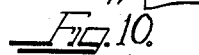
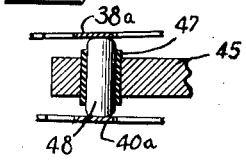
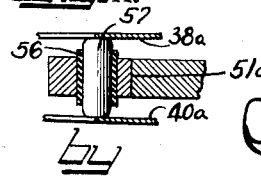
Inventors
MILAN E. MATHESON
WILLIAM J. KRUDER Patented Feb. 3, 1942

2,271,655

UNITED STATES PATENT OFFICE 2,271,655

SIGNAL SWITCH

Milan E. Matheson and William J. Kruder, Chicago, Ill.; said Kruder assignor to said Matheson Application May 1, 1939, Serial No. 271,058

6 Claims. (Cl. 200—59)

This invention relates to apparatus for the operation of direction signals on vehicles.

More particularly the invention relates to automatic and hand-operated signal switches for turn indicators on automotive vehicles.

Right and left-hand turn indicating signals for automotive vehicles should be automatic in operation so that a signal will be given even though the driver of the vehicle forgets to operate a signal switch. At the same time it is also desirable to provide manual control means for the signals so that a signal may be given well in advance of a contemplated turn.

This invention now provides a signal switch especially well adapted for right and left-hand turn indicators on automotive vehicles, which switch is automatically operated by manipulation of the steering mechanism necessary to make the turn and is also operated through manual manipulation independently of the steering mechanism.

The apparatus of this invention is readily installed on standard automotive vehicles and does not require substitution of standard parts or damaging of existing parts.

The apparatus of this invention is readily installed by merely clamping a small switch box on the steering column of the automotive vehicle and by securing switch operating means on the hub of the vehicle steering wheel. The switch box and switch operating means occupy very little space and do not interfere with any equipment on the vehicle.

It is, then, an object of this invention to provide a signal switch adapted for attachment to a vehicle steering column without replacement of steering parts.

Another object of the invention is to provide a simple, relatively inexpensive control means for turn signals which are adapted for easy installation on any automotive vehicle.

A further object of the invention is to provide a signal switch control adapted for easy installation on the hub of a vehicle steering wheel.

Another object of the invention is to provide operating means for turn signal lights on automotive vehicles which are mounted entirely on the outside of the steering column and steering wheel of the vehicle.

A further object of the invention is to provide a signal switch for right and left-hand turn indicating lights on automotive vehicles which is not affected by normal manipulation of the vehicle steering wheel when the vehicle is steered along a relatively straight path.

A further object of the invention is to provide a turn signal control switch for automotive vehicles equipped with both manual and automatic operating means.

Other and further objects of the invention will become apparent to those skilled in the art from the following detailed description of the annexed sheets of drawings which disclose a preferred embodiment of the invention.

On the drawings:

Figure 1 is a top plan view of an automobile with a portion of the roof and hood cut away to illustrate the mounting of a signal switch according to this invention on the steering column and steering wheel thereof.

Figure 2 is an enlarged fragmentary cross-sectional view, with parts shown in elevation, taken along the line II—II of Figure 1.

Figure 3 is an enlarged fragmentary cross-sectional view, with parts in elevation, taken along the line III—III of Figure 2.

Figure 4 is a cross-sectional view, with parts in elevation, taken along the line IV—IV of Figure 2.

Figure 4a is a greatly enlarged side elevational view, with parts in cross section, of an axle and wheel mounting used in the switch of this invention.

Figure 5 is a horizontal cross-sectional view, with parts in elevation, taken along the line V—V of Figure 3.

Figure 6 is an inside view of a half-section of the switch box illustrating the metal contact strips therein.

Figure 7 is an inside view of the other mating half-section of the switch box illustrating the single metal contact strip therein.

Figure 8 is a view similar to Figure 3 to illustrate the automatic operation of the switch by a turning of the steering wheel.

Figure 9 is a view similar to Figure 3 but illustrating the hand operation of the switch.

Figure 10 is an enlarged cross-sectional view with a part in elevation taken along the line X—X of Figure 8.

Figure 11 is an enlarged cross-sectional view with a part in elevation taken along the line XI—XI of Figure 9.

As shown on the drawings:

In Figure 1 the reference numeral 10 designates generally an automobile equipped with left and right-turn indicating lights 11 and 12 mounted at the rear end thereof. It should be understood, of course, that these lights 11 and 12 can be mounted at the front end of the automobile if desired.

The automobile 10 is equipped with a storage battery 13 as is customary and one terminal of the storage battery is grounded to the automobile body as at 14. The other terminal of the storage battery is connected through wire 15 to the usual ignition switch 16.

The automobile 10 has a steering wheel 18 rotatably mounted on top of the column 17.

According to this invention a wire 19 connects the ignition switch 16 with a switch box 20 mounted on the steering column 17. When the ignition switch 16 is on, electric current from the battery 13 can flow through the wires 15 and 19 into the switch box 20. Wires 21 and 22 extend from the switch box 20 to the turn indicating lights 11 and 12 respectively. Only single wire connections are needed between the switch box 20 and the lights since the lights are grounded on the automobile body.

As best shown in Figure 4, the switch box 20 is composed of two mating half-sections 20a and 20b preferably formed of molded plastic material. The half-sections 20a and 20b are held together in assembled relation by means of bolts 23 having heads 23a abutting the half-section 23b and nuts 24 abutting the half-section 20a. The box sections are thus clamped between the heads 23a of the bolts and the nuts 24.

The bolts 23 have additional nuts 25 and 26 threaded thereon for drawing clamps 27 together to clamp the switch box on the steering column 17. The switch box 20 is therefore readily clamped on the steering column 17 near the hub 18a of the steering wheel 18 as shown in Figure 2.

As best shown in Figures 3 and 6 to 9, the box sections 20a and 20b are identical and each have internal boss portions 28 on the side walls thereof provided with bores 28a therethrough to receive the bolts 23. The bolts are thus insulated from the interior of the box 20.

The rims 29 of the box sections 20a and 20b have studs 30 projecting from diagonally opposite corners thereof. Holes 31 are formed in the complementary diagonally opposite corners. Thus when the sections are clamped together, the studs 30 are seated in the holes 31 as shown in Figure 2 to align the peripheral edges of the sections.

Semi-cylindrical openings 32 are formed in each bottom wall of the half-sections 20a and 20b for insertion of the wires 19, 21 and 22. Slots 33 are formed in the top wall of each half-section 20a and 20b for a purpose to be hereinafter more fully described.

Apertured bosses 34 are formed on the inside faces of the box sections 20a and 20b at about the center of the boxes. Additional apertured bosses 35 are formed on these faces of the boxes above the apertured bosses 34.

Pairs of apertured bosses 36 are formed on the inside faces of the box sections 20a and 20b near the top side walls thereof on each side of the boxes as best shown in Figures 4, 6 and 7.

Bolts 37 extend through the apertures of the bosses 36 of the box-section 20a and project through spring brass contact strips 38 and 39. The contact members 38 and 39 are clamped in position by nuts 37a on the bolts. As best shown in Figure 6, the contact members 38 and 39 have spaced opposed head portions 38a and 39a extending into the slot 33 and disposed in spaced relation around the apertured boss 35.

The wire 21 from the left turn signal 11 is connected to the contact strip 38 while the wire 22 from the right turn signal 12 is connected to the contact strip 39. The nuts 37a can also be used for connecting the ends of the wires to the contact strips.

As best shown in Figures 4 and 7, the box section 20b carries a spring brass connector strip 40 on the inside thereof on bolts 41 extending through the apertured bosses 36 thereof. The connector strip 40 is clamped against the bosses by means of nuts 41a on the bolts 41 and the wire 19 from the ignition switch 16 can be secured to one end of the connector strip by means of a nut and bolt 41 and 41a.

The connector strip 40 has an apertured central head portion 40a disposed around the boss 35 of the box section. The head portion 40a is open at the bottom to provide a gap 40b.

As best shown in Figure 4, the contact strips 38 and 39 are held in spaced relation from each other and from the connector strip 40.

As best shown in Figures 2 and 4, an axle 42 is rotatably mounted in the apertures of the bosses 35 of the box sections 20a and 20b and extends through the box. The axle 42 has an enlarged portion 42a abutting the boss 35 on the box section 20a. This enlarged portion 42a extends into the spaces between the contact strips 38 and 40 and 39 and 40. The enlarged portion 42a has an adjoining step-down portion 42b of larger diameter than the terminal ends of the axle 42. This step-down portion 42b is threaded as best shown in Figure 4A and receives a nut 43 in threaded relation thereon. A metal operating wheel 45 having a fluted periphery is mounted on the portion 42b of the axle and clamped between the abutment member 42a and the nut 43 so as to be centered in the space between the contact strips carried by the mating box sections as shown in Figure 4. A helical spring 46 is compressed between the operating wheel 45 and the box section 20b to place a drag on the wheel so that it will only rotate when being manually or automatically driven as will be hereinafter described.

As shown in Figures 2, 3, 8 and 9, the operating wheel 45 extends through the slot 33 at the top of the box 20 and has sprocket teeth 45a extending substantially around its entire periphery adapted to project beyond the top of the box.

As best shown in Figures 2 and 10, a fiber or other insulating bushing 47 is pressed through an aperture in the operating wheel 45. A brass pin 48 is securely fitted in the bushing 47 and projects from each side of the wheel 45. The pin 48 is somewhat longer than the space between the opposed brass contact strips and will spring the heads of these strips apart when the wheel is moved to position the pin between the strips. As shown in Figures 3 and 6 to 9, in one position of the wheel the pin 48 will be disposed in the space between the heads 38a and 39a and in the gap 40b of the head 40a of the brass strips. In this neutral position of the wheel, the strips are allowed to resume their normal positions.

As shown in Figure 2, a second axle 50 extends through the box 20 and is rotatably mounted in the apertures of the bosses 34 of the box. This axle 50 has an enlarged portion 50a abutting the boss 34 of the box section 20a. A step-down portion 50b of the axle carries a rocker arm 51 therearound. This step-down portion 50b is threaded similarly to the step-down portion 42b of the axle 42 and receives, in threaded relation thereon, a nut 52 clamping the rocker arm 51 against the shoulder formed by the enlarged portion 50a. The rocker arm is thus centered in the housing 20 between the opposed contact strips as shown in Figure 4.

A helical spring 53 is disposed around the axle 50 between the nut 52 and the boss 34 of the box section 20b to place a drag on the operation of the rocker arm 51.

As best shown in Figures 2 and 5, the axle 50 projects beyond the box section 20b and receives a collar 54 in threaded relation on the end thereof.

Rods such as 55 are threaded through the collar 54 against the axle 50 and clamp the collar against rotation on the axle.

As best shown in Figures 3, 8 and 9, the rocker arm 51 envelops the lower portion of the operating wheel 45 and has end portions 51a adapted to be rocked into the spaces between the teeth 45a of the operating wheel 45.

The end portions 51a of the rocker arms 51 have fiber or other insulating sleeves 56 pressed therethrough as best shown in Figure 11. A brass contact pin 57 is securely fitted in each sleeve 56 and projects beyond the sides of the rocker arm.

As shown in Figure 4, the contact pins 57 are longer than the space between the opposed contact strips.

When a rod 55 is manually tilted to rotate the axle 50 for tilting the rocker arm 51 either to the right or to the left and thereby move an end 51a thereof into a space between the teeth 45a of the operating wheel, a pin 57 will be moved between the contact strips to bias the same as shown in Figure 11 and thereby cause current to flow to either the light 11 or the light 12, depending upon which way the rocker arm was tilted. Thus, a tilting of the rocker arm into the position shown in Figure 9 will cause current to flow between the contact strip 38 and the contact strip 40, thereby energizing the wire 21 to light the left-hand turn signal lamp 11.

This manual control of the switch is desirable to signal a turn before the vehicle starts to turn.

The switch of this invention is also automatically operated through automatic operation of the wheel 45. This is accomplished by spring-pressed buttons 60 carried on the hub 18a of the steering wheel 18 striking against the gear teeth 45a of the operating wheel 45.

As shown in Figure 3, the buttons 60 project from housings 61 which are pressed through the end portions of a metal bracket 62 having an upturned leg portion 62a secured on the hub 18a by means of screws 63. The bracket 62, as shown in Figure 5, is arcuate in shape to envelop a portion of the hub 18a. The upturned leg 62a can be somewhat flexible so as to assume the contour of the hub 18a as shown in Figures 2 and 3. The bracket 62 is readily secured to the hub 18a by merely tapping screws into the plastic material, wood, metal or other material forming the hub 18a.

As shown in Figure 3, the buttons 60 are urged through the bottom of the housings 61 by springs such as 64 held under compression in the housings between a top wall member 65 and the button 60. The button 60 is prevented from falling out of the housing by a flange 61a on the bottom of the housing.

The buttons 60, as shown in Figure 3, are thus carried above the switch box 20 but are adapted to engage the teeth 45a of the operating wheel 45. The bracket 62 holds the buttons 60 in spaced relation on each side of the operating wheel when the steering wheel 18 is held to steer the automobile along a straight course. Ordinary movements of the steering wheel, such as are encountered when steering along a straight course, will not move the buttons for a sufficient distance to contact the teeth 45a. However, when the steering wheel 18 is rotated either to the right or to the left for the purpose of turning the vehicle, one of the buttons will contact a tooth 45a of the operating wheel to move the wheel so that the contact point carried thereby will engage the contact strips as shown in Figures 8 and 10.

The wheel 45 has a sufficient number of teeth 45a so that it can be successively turned by succeeding buttons 60 as the same pass thereover even though the steering wheel is rotated through several revolutions.

It is customary, on present-day automobiles, to arrange the steering ratio so that the steering wheel is rotated through three complete revolutions in order to produce the maximum amount of turning of the front wheels. Three revolutions of the steering wheel will cause the wheel 45 to be moved five times by the buttons 60 and it will be noted from Figure 3 that there are five teeth available on the operating wheel for such purpose. Movement of the steering wheel back to a straight steering position will cause the buttons to operate against the teeth 45a in the reverse direction thereby bringing the contact point 48 on the operating wheel 45 back into neutral position in the space between the heads of the contact strips 38a and 39a and into the gap 40b of the contact strip 40.

The buttons 60 are spring-pressed in order to prevent rotation of the operating wheel 45 through vibration of a button against a tooth 45a as when the button is in a position adjacent to the tooth but prior to a turning of the steering wheel for a sufficient amount to cause a desired reaction on the tooth. The use of rigid actuating points or buttons for the operating wheel may cause movement of the wheel before the same is desired.

From the above description it should be understood that the switch box 20 can be manually operated by manipulation of the rods 55 and can also be automatically operated by a mere rotation of the steering wheel 18. Thus the driver can give a turn signal well in advance of a contemplated turn by movement of a rod 55 which is in easy reach from the steering wheel and, in the event that the driver forgets to operate the rod 55, a turning of the steering wheel will automatically give the turn signal.

The turning of the control wheel 45 by a button 60 will disengage the rocker arm 51 in the event that the same has previously been manually rocked to throw a contact point 57 thereon into engagement with the connector strips. As shown in Figure 9, the ends 51a of the rocker arm 51 fit into the flutes between the teeth 45a of the wheel 45 and a rotation of the wheel will cause the teeth to move the engaged end 51a out of contact position.

It should also be understood from the above description that the control apparatus of this invention is readily mounted on the steering column and hub of the steering wheel of any automotive vehicle. If desired, the switch box can be mounted on or in the steering wheel and the button carrying bracket can be stationarily mounted on the steering column. If the box is interiorly mounted in the steering wheel the operating wheel will project to contact the buttons.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A switch box for a turn signal which comprises a pair of mating half-box sections, a metal conductor strip in one of said box sections, said strip having a central aperture therethrough and having a gap below said aperture, a pair of longitudinally spaced conductor strips in the other of said box sections aligned transversely with said first mentioned strip in spaced opposed relation therefrom, an axle extending transversely through said box and through the aperture in said first mentioned strip and the space between said longitudinally spaced strips, a wheel mounted on said axle in the space between the opposed strips, a contact point on said wheel having a length greater than the distance between the spaced opposed conductor strips, and means for rotating said wheel to move the contact member out of said gap and out of the space between the longitudinally spaced strips to bring the member between the strips for biasing the strips outwardly to establish firm electrical connections therebetween.

2. A switch for a turn signal comprising a box having an opening in a side wall thereof, longitudinally spaced conductors in said box adjacent said opening, a conductor strip in said box spaced transversely from said longitudinally spaced conductors, a wheel rotatably mounted in said box between the longitudinally spaced conductors and the conductor strip, a contact pin carried by said wheel having a length greater than the distance between the conductors and conductor strip for bridging the space between the transversely spaced conductors and conductor strip while biasing the conductors and strips outwardly, and means for rotating said wheel to move the pin for establishing selective firm connections between either one of the longitudinally spaced conductors and the conductor strip.

3. A signal switch comprising a box having a slot through the top thereof, a fluted operating wheel in said box projecting through said slot, a contact point carried by said wheel and projecting from both sides thereof, a pair of longitudinally spaced conductors on one side of said wheel, a conductor strip on the other side of said wheel having an apertured central portion providing a gap at the bottom of the strip, said conductors and conductor strip being spaced from said wheel for a distance less than the length of projection of the contact point from the wheel, and means for rotating the wheel to move the contact point into firm engagement with either one of the conductors and the conductor strip while biasing the conductor strip and selected conductor outwardly, said contact point in one position of the wheel being disposed in the gap of the conductor strip and in the space between the conductors.

4. A signal switch comprising a box, a fluted wheel rotatably mounted in said box, conductors in said box on both sides of the wheel in spaced relation therefrom, a contact pin extending from both sides of the wheel for engagement with said conductors, an arcuate rocker arm in said box adjacent said wheel, contact pins on the ends of said arm for engagement with said conductors, means outside of said box for tilting the rocker arm to bring an end thereof into a flute of said wheel and establish engagement of a rocker arm contact pin with the conductors, and means for rotating said wheel to establish independent engagement of the contact pin thereon with the conductors while simultaneously moving said end of the rocker arm out of the flute and said rocker arm pin out of engagement with the conductors.

5. A signal switch comprising a box, an operating wheel rotatably mounted in said box, conductors in said box on both sides of the wheel in spaced relation therefrom, a contact pin extending from both sides of the wheel for engagement with said conductors, a rocker arm in said box adjacent said wheel, contact pins on the ends of said arm for engagement with said conductors, means outside of said box for tilting said rocker arm to establish engagement of a contact pin thereon with the conductors, and means for rotating said wheel to establish independent engagement of the contact pin thereon with the conductors while simultaneously moving said rocker arm to disengage the rocker arm contact pin from the conductors.

6. A turn signal control for vehicles having a stationary steering column and a rotatable hubbed steering wheel which comprises a switch box mounted on said steering column having an opening in a side wall thereof, a fluted wheel rotatably mounted in said box and projecting through said opening, operating means for the fluted wheel mounted on the hub of the steering wheel in the path of the projecting portion of the fluted wheel, conductors in said box on both sides of the fluted wheel in spaced relation therefrom, a contact pin extending from both sides of the fluted wheel for engagement with said conductors, a rocker arm in said box adjacent said fluted wheel, contact pins on the ends of said arm for engagement with said conductors, means outside of the box for tilting the rocker arm to establish engagement of a rocker arm contact pin with the conductors, and end portions on said rocker arm engageable by the fluted wheel for disengaging a rocker arm contact pin from the conductors when said operating means on the hub of the steering wheel actuate said fluted wheel.

MILAN E. MATHESON.
WILLIAM J. KRUDER.